United States Patent [19]

Hicks et al.

[11] Patent Number: 4,924,664
[45] Date of Patent: May 15, 1990

[54] DUCTED COVER GRASS COLLECTION SYSTEM

[76] Inventors: John E. Hicks, 1940 Yorkshire Ct., Lincoln, Nebr. 68506; Michael E. Allen, 5341 S. 68 St., Lincoln, Nebr. 68516

[21] Appl. No.: 259,163

[22] Filed: Oct. 18, 1988

[51] Int. Cl.⁵ .............. A01D 34/12; A01D 34/48; A01D 34/70; A01D 35/035
[52] U.S. Cl. ........................... 56/202; 56/16.6
[58] Field of Search ....................... 56/202, 16.6

[56] References Cited

U.S. PATENT DOCUMENTS

| | | |
|---|---|---|
| 3,006,128 | 11/1961 | Weiland .................. 56/16.6 |
| 3,971,198 | 7/1976 | Lane ..................... 56/202 |
| 3,974,631 | 8/1976 | Rhodes ................... 56/202 |
| 4,173,111 | 11/1979 | Peterson ................. 56/202 |
| 4,310,998 | 1/1982 | Cuba ..................... 56/202 |
| 4,426,830 | 1/1984 | Tackett .................. 56/202 |
| 4,476,668 | 10/1984 | Reilly ................... 56/16.6 |
| 4,487,007 | 12/1984 | Mullet et al. ............ 56/16.6 |
| 4,523,788 | 6/1985 | Pradad ................... 298/11 |
| 4,532,755 | 8/1985 | Schemelin et al. ......... 56/16.6 |
| 4,709,541 | 12/1987 | Broman et al. ............ 56/202 |
| 4,738,088 | 4/1988 | Klever et al. ............ 56/202 |
| 4,761,943 | 8/1988 | Parker et al. ............ 56/202 |

Primary Examiner—Jerome W. Massie, IV
Assistant Examiner—Gay Spahn
Attorney, Agent, or Firm—Michael D. Rechtin; Philip P. Mann

[57] ABSTRACT

A ducted cover grass collection system for a lawn mower includes a hopper with a front end having an inlet, a rear end having an outlet and an open upper end, a deflector hood located at the front end to partially cover the open upper end, and a lid covering the remainder of the open upper end, the lid having a duct open at a front end and having a rear end in communication with the outlet so that a flow of clippings and air is introduced through the inlet and projected generally horizontally toward the rear end of the hopper, so that the clippings settle to the bottom of the hopper, after which the air is directed back toward the deflector hood, through the duct and is discharged via the outlet. An air flow indicator located in the hopper lid pivots when the air flow in the duct decreases, signaling that the hopper is filled with clippings.

15 Claims, 2 Drawing Sheets

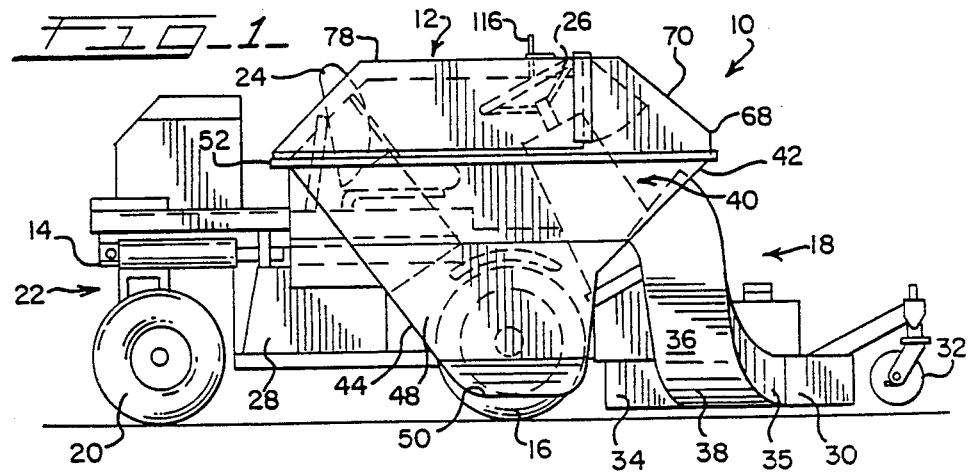
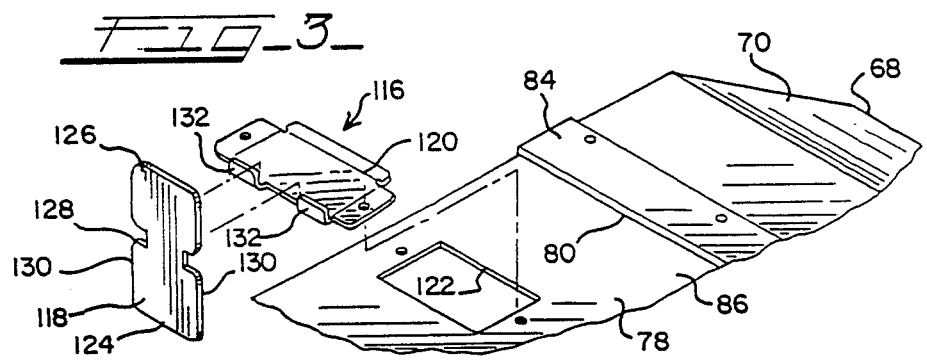
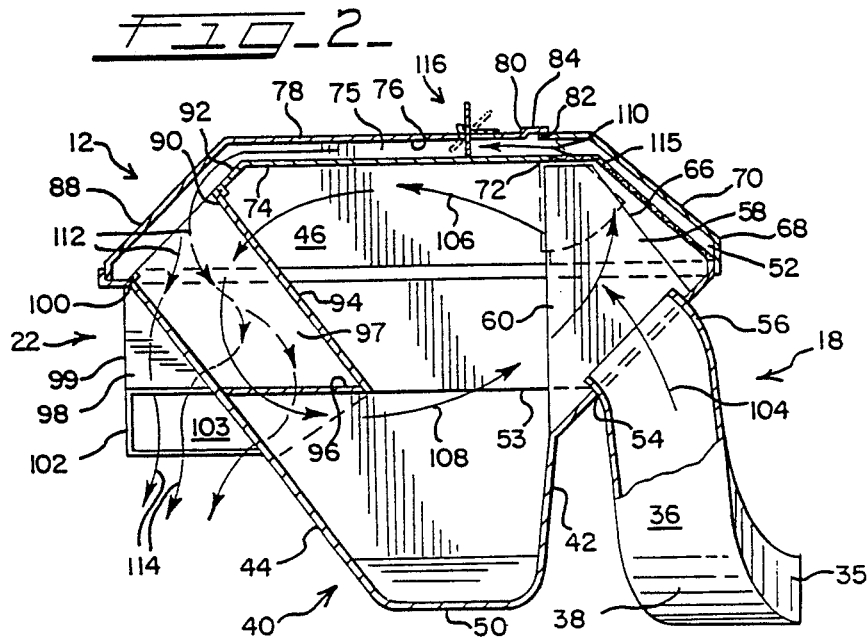

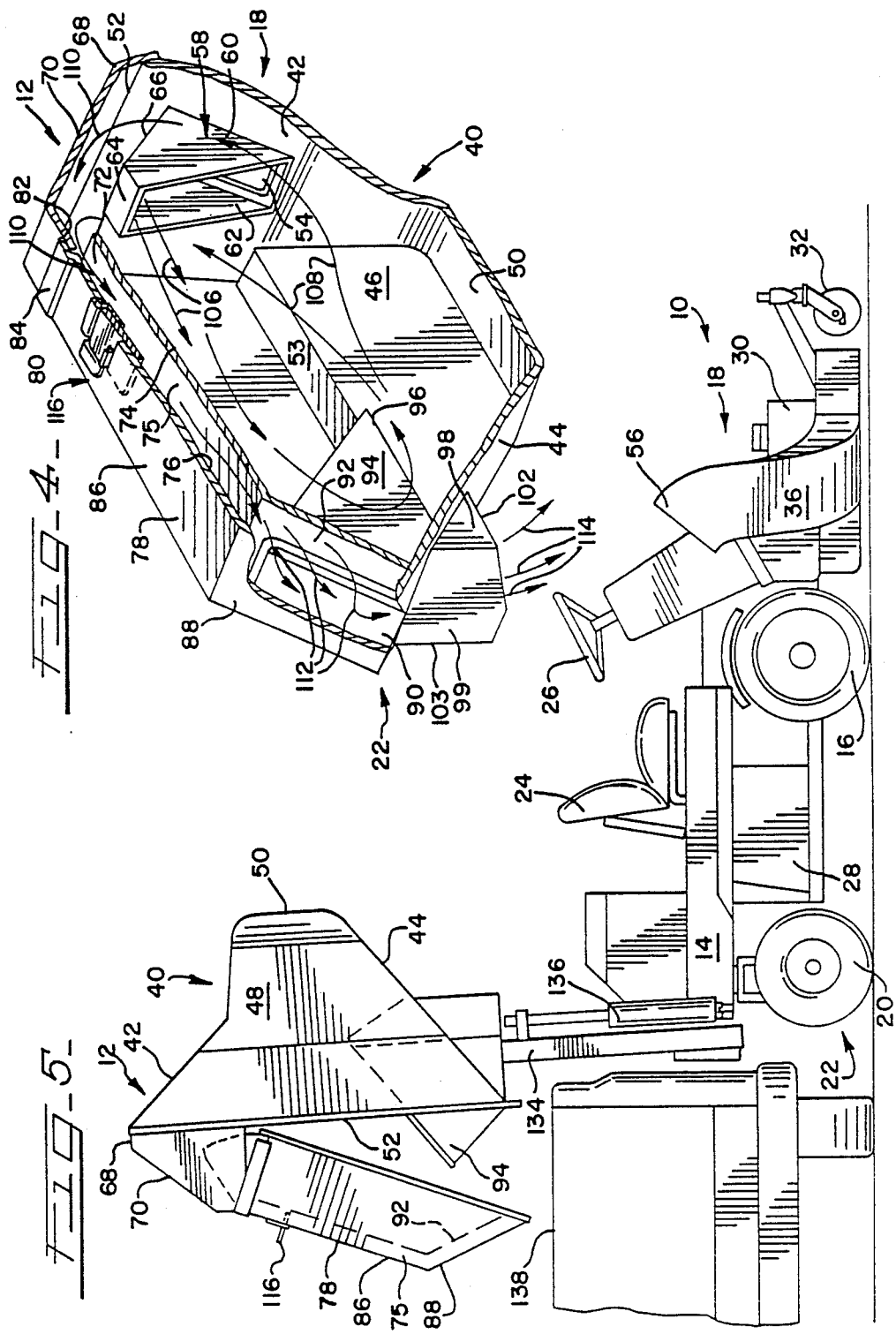

DUCTED COVER GRASS COLLECTION SYSTEM

BACKGROUND OF THE INVENTION

The present invention relates generally to lawn maintenance equipment and more specifically to a system adapted to collect grass clippings and other lawn debris in a manner which minimizes operator discomfort and facilitates the disposal of collected material.

A variety of systems have been proposed for collecting the clippings and other lawn debris generated by the operation of rotary mower blades. Many of such systems involve the use of rigid or flexible containers, sometimes having disposable bag liners, which must be frequently emptied due to their small size. Even when larger bags are provided, this frequent emptying is a tedious task which decreases operational efficiency, particularly when large expanses of lawn area, such as golf courses, parks, and athletic fields are being maintained.

Several conventional grass collection systems employ a supplemental blower to enhance the flow of clippings into the container. However, the advantages provided by these blowers are often offset by their significant installation and maintenance costs.

A further drawback of conventional grass collection systems is that some provision must be made for the exhaust of air and fine dust from the collection container. It is often the case that the collection container and its discharge outlet are located in close proximity to the operator, who is then exposed to irritating dust particles and exhaust air.

In addition, many conventional grass collection systems fail to provide the operator with a readily visible indicator of the level of clippings and debris in the closed collection container. Without such an indicator, the operator must frequently check the level of grass in the container, consuming valuable time, or wait until the container overflows, causing a cleanup problem.

Thus, there is a need for a lawn mower grass collection system which is easily and quickly emptied, which does not require a supplemental blower, which diverts dust and exhaust away from the operator, and which provides an indication of when the container is filled.

SUMMARY OF THE INVENTION

A ducted cover grass collection system for a lawn mower includes a rigid, generally tapered hopper having front and rear inclined walls, opposing sidewalls and an open upper end, the front end having an inlet, the rear end having an outlet, the upper open end being covered with a deflector hood at a front end thereof and a hopper lid pivotally secured to a rear edge of the deflector hood and having an air flow duct. The lid air flow duct is in communication with the outlet, which has an exhaust chute adapted to discharge air, dust and other debris near the ground and away from the operator. An air flow indicator may be mounted to the lid to indicate when the air flow has decreased due to increased levels of clippings in the hopper.

Incoming air and clippings are projected from the inlet generally horizontally toward the rear wall so that the clippings may settle to the bottom of the hopper. Settling is enhanced by the significant reduction in the velocity of the incoming air and by the fact that the air flow changes direction several times, being deflected from the rear wall to the deflector hood, into the lid air flow duct and out the exhaust chute of the outlet.

BRIEF DESCRIPTION OF THE DRAWINGS

FIG. 1 is a side elevational view of a conventional mower incorporating the ducted cover grass collection system of the invention;

FIG. 2 is a vertical sectional view of the collection system as shown in FIG. 1;

FIG. 3 is an exploded front perspective elevational view of the air flow indicator of the invention;

FIG. 4 is a front perspective elevational view of the grass collection system of the invention partially cut away to show air flow pattern therein; and FIG. 5 is a side elevational view of the mower and grass collection system of FIG. 1 shown in the dumping position.

DESCRIPTION OF THE PREFERRED EMBODIMENT

Referring now to the drawings, FIG. 1 depicts a lawn mower, generally designated 10, shown equipped with the ducted grass collection system of the invention generally designated 12. The mower 10 is of a conventional type and will thus be described only in general terms.

The mower 10 includes a frame 14 supported for movement on a pair of opposed traction wheels 16 disposed at a front end 18 of the mower, and a single pivotally mounted wheel 20 disposed at a rear end 22. An operator seat 24 is secured to the frame 14, and a steering wheel 26 is mounted in front of the seat 24 to be operatively connected to the pivot wheel 20 to provide directional control of the mower 10. An engine 28 mounted on the frame 14 supplies power to the traction wheels 16 by means of a hydrostatic transmission, differential and axle arrangement (not shown). Engine controls, transmission controls and wheel braking controls are provided at an operator station in a conventional fashion, the details of which have been omitted from the drawings.

A mower deck 30 is pivotally connected to the frame 14 and is adapted to articulate thereon as required to maintain a specified position relative to the ground as the mower travels over undulating terrain, with the assistance of a pair of casters 32. In FIGS. 1 and 5, 10 the mower deck 30 and the casters 32 are shown in an elevated transport position. The mower deck 30 includes a plurality of rotary cutting blades (not shown), the rotational directions of which are coordinated so as to direct a discharge flow of grass clippings and lawn debris toward the right hand side 34 thereof. The right side 34 of the deck 30 includes a discharge opening (not shown) enclosed by a lower end 35 of a discharge chute 36. The discharge chute 36 includes an upstanding vertical hollow member which is preferably formed of a durable molded plastic having non-stick characteristics, such as a cross-linked polyolefin. The chute 36, although predominantly vertically oriented, at its lower end 35 includes a smoothly curved transition portion 38 directed toward and communicating with the discharge duct (not shown).

Rotary lawn mowers characteristically produce a substantial air flow through the discharge chute 36 for several purposes. A primary consideration is the clearing of the cut grass and lawn debris from the interior of the mower deck 30 to prevent clogging of the region in which the blades are rotating and the adhering of materials to the sides of the deck housing. Of additional importance is the lifting of the grass into a vertical attitude to permit the cutting blades to engage and cut the individual grass blades to a uniform height. Some types of lawn grasses and many types of weeds, such as crabgrass, are apt to assume a horizontal rather than vertical disposition, and the suction effect produced by the whirling mower blades is quite important in producing a satisfactory cutting action. Although good results can be obtained with a conventional mower deck utilized in conjunction with the present invention, for the most effective results, the invention is preferably used with a deck designed to produce a high degree of lift of the grass and a consequent high discharge rate of the cut grass and debris through the discharge duct. The use of a supplemental blower should not be necessary to provide sufficient air flow to the collection system 12.

The ducted cover grass collection system 12 generally includes a hopper 40, which is a rigid structure preferably formed of molded plastic of a durable, non-stick type, such as cross-linked polyolefin. In the preferred embodiment, the hopper 40 includes a front wall 42 having an outwardly inclined upper portion, an outwardly inclined rear wall 44, and inner and outer sidewalls 46, 48 respectively (the inner sidewall best seen in FIG. 2), which together define a hopper with a relatively small bottom 50 and a relatively larger open upper end 52. The inner sidewall 46 includes an inner step 53 (best seen in FIG. 4) which allows the hopper 40 to nest compactly over the wheel 16.

Referring now to FIGS. 2 and 4, the inclined portion of the front wall 42 of the hopper 40 is provided with an inlet opening 54 dimensioned to receive an upper end 56 of the discharge chute 36. The opening 54 is oversized to permit relative movement of the chute 36 and the hopper 40 as may be expected to occur in view of the articulated connection of the mower deck 30 to the frame 14 and the mounting of the chute to the mower deck. To provide a sealing of the gap between the upper end 56 of the chute 36 and the hopper opening 54, a plurality of brushes (not shown) are mounted within the hopper so as to project into the opening 54. The brushes, described in greater detail in commonly assigned U.S. Pat. No. 4,709,541, form a flexible seal which effectively prevents the leakage of grass clippings, dust or debris from the hopper 40.

In the preferred embodiment, the hopper 40 is provided with an inlet hood 58 (best seen in FIG. 4) mounted to an inside surface of the front wall 42 so as to circumscribe the inlet opening 54. The inlet hood 58 has a pair of spaced sidewalls 60, 62, a top 64 and an inclined front wall 66 which collectively deflect the incoming air passing generally vertically through the inlet 54 from the upper end 56 of the chute 36, to a generally horizontal rearward direction within the hopper 40.

A deflector hood 68 having a rearwardly inclined surface 70 is mounted over the open upper end 52 of the hopper 40 at the front end 18 thereof. The deflector hood 68 is designed to receive air and fine dust deflected by the rear wall 44 and deflect same toward an open front end 72 of a cover liner 74 defining a lid air flow duct 75.

The cover liner 74 is preferably a generally planar sheet mounted in spaced depending relationship to the underside 76 of a hopper cover or lid 78, which, with the deflector hood 68, completely covers the upper open end 52 of the hopper 40. The lid 78 is pivotally connected at a front end 80 thereof to a rear edge 82 of the deflecting hood 68 by means of a hinge 84. The lid 78 has a generally horizontal portion 86 and a back sloped rear portion 88. If desired, the cover liner 74 may be an integral part of the lid 78.

An exhaust duct opening 90 is located in a back sloped portion 92 of the lid duct 74 which parallels the back sloped portion 88 of the lid 78. An internal exhaust duct 94 is located adjacent the rear wall 44 on a generally horizontal plane with the front wall inlet opening 54. In the preferred embodiment, the duct 94 is disposed in a corner of the hopper 40 formed by the inner sidewall 46 and the rear wall 44. The duct 94 has a lower end 96 which is secured to the inner step 53, and also has an open inner side portion 97 (best seen in FIG. 2) in communication with a substantially open portion of an outer wall 98 of an external exhaust duct 99. Appropriate weather strip material 100 (best seen in FIG. 2) is attached around the internal exhaust duct 94 where it engages the opening 90 in order to prevent grass and/or debris from passing directly into the ducts 94, 99 from the hopper interior. The external exhaust duct 99 has a discharge outlet or opening 102 designed to discharge air and fine dust or debris near the ground and directing the discharge flow away from the mower 10 and the operator. In the preferred embodiment, the discharge flow is deflected by an inner wall 103 of the duct 99 which is longer than the outer duct wall 99.

The hinged lid 78, the inlet hood 58, the deflector hood 68, the cover liner 74, the internal exhaust duct 94 and the external exhaust duct 99 are all made of either light (20 Ga.) sheet steel or plastic or other self supporting materials which will contain the grass, debris and air, forcing it to travel a specified route within the hopper 40.

The interior of the hopper 40 is designed so that air clippings and debris collected under negative pressure by the deck 30 and directed through the discharge chute 36 enters the hopper through the inlet opening 54. The incoming flow of air, indicated by the arrow 104 (FIG. 2), is deflected by the inlet hood 58 in a generally rearward horizontal direction as indicated by the arrows 106. The large volume of the hopper 40 relative to the discharge chute 36 causes the velocity of the incoming air to be reduced, lowering its capacity to keep the grass clippings and debris suspended. Accordingly, the clippings and debris rapidly settle to the bottom 50 of the hopper 40.

As the air reaches the rear wall 44, it is deflected back toward the front wall 42 on either side of the inlet hood 58, as indicated by the arrows 108, to permit further settling of grass and debris. The inclined upper portion of the front wall 42 and the deflector hood 68 are configured to direct the flow of air and any remaining dust and finer debris particles into the open end 72 of the lid duct 75, as indicated by the arrows 110. The air is then directed through the duct 75 and into the internal exhaust duct 94 through the opening 90, as indicated by the arrows 112. The exhaust air and dust are then discharged through the discharge opening 102, as indicated by the arrows 114.

As the hopper 40 fills, the volume available for air velocity reduction decreases, but the directional changes caused by the internal hopper configuration become more extreme, thus maintaining the effectiveness of the system 12. The size of the duct work and openings within the hopper 40 are designed to maintain at least 1 ½ times the area of the discharge chute 36, thus further reducing the velocity of the exhaust air emitted through the discharge opening 102. If desired, an optional coarse leaf screen 115 (seen in FIG. 2) may be employed to keep leaves and other coarse light debris from being drawn into the lid duct 75.

Referring now to FIG. 3, the horizontal portion 86 of the lid 78 may be provided with an air flow indicator 116 including an indicator plate 118 preferably fabricated of 20 Ga. sheet steel, and a bracket 120 adapted to be mounted over an opening 122 in the lid 78 by means of suitable fasteners (not shown). The plate 118 is designed so that it is heavier at its lower end 124 than at its upper end 126. In the preferred embodiment, the lower end 124 is weighted by the placement of a pair of lateral notches 128 in vertical side edges 130 of the plate 118. The notches 128 are located on a horizontal axis disposed slightly above an imaginary horizontal center line of the plate 118 to create a heavier lower end 124. In addition, the notches 128 are designed to be engaged by a pair of laterally spaced upstanding tabs 132 fixed to a rear end of the bracket 120.

The indicator 116 is designed so that the lower end 124 of the plate 118 depends through the opening 122 and into the lid duct 75. As air flows rearwardly through the duct 74, the lower end 124 of the plate 118 is pushed upwardly to achieve a generally horizontal position (best seen in FIG. 4). As the flow of air slows or stops, the indicator plate 118 returns to a vertical position by virtue of the biasing force provided by the heavier lower end 124. Thus, as the hopper 40 fills, the air flow through the duct 75 decreases and the plate 118 becomes more vertical, indicating to the operator that dumping is required.

Referring now to FIG. 5, the hopper 40 is secured to the frame 14 by a pivoting lift arm 134, the movement of which is effected by a hydraulic cylinder 136 controlled by the operator. The details of the attachment of the hopper 40 to the frame 14 and the operation of the dumping mechanism are disclosed in greater detail in commonly assigned U.S. Pat. No. 4,709,541. When the indicator 116 indicates that the hopper is filled, the operator orients the mower 10 so that the rear end 22 is disposed adjacent a clipping storage container 138 depicted as a wagon.

Once the lift arm 134 reaches a vertical position as shown in FIG. 5, the lid 78 swings open through the force of gravity, permitting the discharge of clippings and debris into the wagon 138. The inclined rear wall 44 facilitates dumping of the clippings, and the low friction material of the hopper prevents clogging due to adhesion of debris to the hopper. Further, the sloping configuration of the rear portions 88 and 92 respectively of the lid 78 and liner 74 also facilitates the discharge of any trapped clippings or debris. If a screen 115 is employed, its orientation as pictured in FIG. 2 allows debris to fall away when the hopper 40 is raised for dumping. Once the hopper 40 is emptied, the hydraulic cylinder 136 returns the lift arm 134 to the horizontal position of FIG. 1, and the mower 10 may continue its normal operation.

It will be appreciated that the ducted cover grass collection system of the invention is easy to operate, has a minimum of internal moving components, thus requiring minimum maintenance, and is safe for the operator in that it discharges dust and exhaust air near the ground and directs same away from the operator's seat 24.

While a preferred embodiment of the ducted cover grass collection system has been shown and described it will be appreciated by persons skilled in the art that modifications may be made without departing from the scope of the invention in its broader aspects and as set forth in the following claims.

We claim:

1. A ducted cover grass collection system for a lawn mower, comprising:
   a hopper having a front end, a rear end, opposing sidewalls and an open upper end;
   inlet means located at said front end of said hopper;
   outlet means located at said rear end of said hopper;
   deflector means attached to said front end of said hopper to partially cover said open upper end;
   a solid hopper lid pivotally connected to said deflector means;
   said hopper lid adapted to cover the remainder of said open upper end and having a duct with a front end and a rear end, said front end of said duct adapted to receive air deflected by said deflector means, said rear end of said duct being in communication with said outlet; and
   said inlet means including an inlet hood projecting into said hopper to direct incoming air and entrained clippings generally horizontally toward said rear end of said hopper so that the incoming air impacts said rear end of said hopper and is deflected back towards said inlet hood and said deflector means, and eventually into said duct in said hopper lid.

2. The system as defined in claim 1 wherein said deflector means is a deflector hood.

3. The system as defined in claim 1 wherein said outlet means is provided with an internal exhaust duct and an external exhaust duct, said ducts being in communication with each other.

4. The system as defined in claim 3 wherein said internal exhaust duct is located adjacent said rear end of said hopper and near said open upper end of said hopper.

5. The system as defined in claim 4 wherein said external exhaust duct is positioned to discharge exhaust air near the ground and away from an operator.

6. The system as defined in claim 1 wherein said inlet means and said outlet means are positioned within said hopper on a generally horizontal plane at said open upper end of said hopper.

7. The system as defined in claim 1 wherein said duct of said hopper lid is formed from a substantially flat liner positioned in spaced relationship from an underside of said lid and having a front end in communication with said deflector means and a back sloping rear portion which includes an opening in communication with said outlet.

8. The system as defined in claim 1 further including an air flow indicator adapted to indicate when air flow in said hopper is reduced.

9. The system as defined in claim 8 wherein said indicator is a plate weighted at a lower end thereof and pivotally suspended along a horizontal axis in an opening in said hopper lid.

10. The system as defined in claim 1 wherein said mower has a lift arm, and said hopper is adapted to be secured to said lift arm so as to be lifted to a vertical position for discharging collected clippings and debris.

11. A ducted cover grass collection system for a lawn mower, comprising:
    a hopper having an inclined front wall, an inclined rear wall, inner and outer opposing sidewalls, a bottom and an open upper end;

an inlet located in said front wall and having means adapted to direct an incoming flow of air and grass clippings generally horizontally toward said rear wall;

an outlet located in said inner sidewall adjacent said rear wall and adapted to discharge air from a lower end thereof;

a deflector hood having an inclined deflector surface and being attached to said upper end of said hopper adjacent said front wall, said hood adapted to receive a flow of air deflected from said rear wall, and to direct it generally upwardly;

a solid hopper lid pivotally connected to a rear edge of said hood, said lid having a duct with a front end open to said hood, and a rear end in communication with said outlet; and said hopper lid being provided with an air flow indicator, said air flow indicator including a bracket and a generally flat plate having a weighted lower end and being pivotally suspended from said bracket in an opening in said door in a position transverse to a flow of air in said duct, so that when the air flow through said duct decreases, said weighted upper end assumes a generally vertical position.

12. The system as defined in claim 11 wherein said inlet and said outlet are located on said respective front and rear walls of said hopper on a generally horizontal plane.

13. The system as defined in claim 11 wherein said plate has a pair of lateral edges, each said edge having a notch, said notches located along a horizontal axis of said plate and adapted to engage said bracket.

14. A ducted cover grass collection system for a lawn mower, comprising:

a hopper having a front end, a rear end, opposing sidewalls and an open upper end;

inlet means located at said front end of said hopper;

outlet means located at said rear end of said hopper;

deflector means attached to said front end of said hopper to partially cover said open upper end;

a solid hopper lid pivotally connected to said deflector means;

said hopper lid adapted to cover the remainder of said open upper end and having a duct with a front end and a rear end, said front end of said duct adapted to receive air deflected by said deflector means, said rear end of said duct being in communication with said outlet; and said duct of said hopper lid being formed from a substantially flat liner positioned in spaced relationship from an underside of said lid and having a front end in communication with said deflector means and a back sloping rear portion which includes an opening in communication with said outlet.

15. A ducted cover grass collection system for a lawn mower, comprising:

a hopper having a front end, a rear end, opposing sidewalls and an open upper end;

inlet means located at said front end of said hopper;

outlet means located at said rear end of said hopper;

deflector means attached to said front end of said hopper to partially cover said open upper end;

a solid hopper lid pivotally connected to said deflector means;

said hopper lid adapted to cover the remainder of said open upper end and having a duct with a front end and a rear end, said front end of said duct adapted to receive air deflected by said deflector means, said rear end of said duct being in communication with said outlet; and an air flow indicator adapted to indicate when air flow in said hopper is reduced, said indicator being a plate weighted at a lower end thereof and pivotally suspended along a horizontal axis in an opening in said hopper lid.

* * * * *